United States Patent Office 2,955,050
Patented Oct. 4, 1960

2,955,050

WATER FASTNESS OF METAL LAKES OF AZO DYESTUFFS CONTAINING SULPHONIC ACID GROUPS

Emil Stocker, Riehen, near Basel, Switzerland, assignor to J. R. Geigy A.-G., Basel, Switzerland, a Swiss firm No Drawing. Filed July 15, 1957, Ser. No. 671,687

Claims priority, application Switzerland July 17, 1956

4 Claims. (Cl. 106—289)

The present invention concerns a process for improving the water fastness of metal lakes of azo dyestuffs containing sulphonic acid groups. It also concerns agents for improving such metal lakes as well as the lakes treated therewith. Finally, it concerns the use of the latter for pigmenting organic material in particular high molecular natural substances and high molecular synthetic polymerisation, polycondensation and polyaddition products.

The treatment with certain organic nitrogen compounds of textiles which have been dyed with sulphonated substantive dyestuffs to improve the water fastness of the dyeings, is already known. It is assumed that the activity of such agents consists mainly in a chemical reaction with the dyestuff anion to form a compound which is insoluble in water which is also the reason why at times relatively large amounts of the auxiliary agent are necessary. On the other hand, the conversion of dyestuffs containing acid groups with the necessary amounts of certain organic nitrogen bases into water insoluble colour salts is also already known. Some of the colour salts previously mentioned differ strongly from the azo dyestuffs laked with metal, in particular with earth alkali metal salts, in their coloring properties and in the fastness of the pigmentations attained therewith. Several metal lakes however, are of great technical interest, but some of them are considerably water soluble in spite of the complete "laking" of their sulphonic acid groups. This undesirable property makes itself felt for example by the insufficient fastness to wet rubbing of the coloured synthetic masses attained therewith.

It has now surprisingly been found that the water fastness of metal lakes of the azo dyestuffs containing sulphonic acid groups can be improved if they are thoroughly mixed with small amounts of water soluble nitrogen compounds which have a precipitating action on the aqueous solutions of sulphonated dyestuffs. These small amounts of organic nitrogen compounds, on the average 5 to 12% by weight of the metal lake dyestuff used is sufficient, increase the water fastness of the latter quite considerably without, however, having an unfavourable influence on the colouring properties thereof. If organic material such as e.g. thermoplastic synthetic materials, are coloured with these improved metal lake dyestuffs which are practically insoluble in water, then this material has good to very good fastness to wet rubbing.

In the present process chiefly the calcium, barium, also the manganese, strontium, aluminium, tin, zirconium and sodium compounds of azo dyestuffs containing sulphonic acid groups, in particular the o-sulphonated mono-azo dyestuffs, are meant by colour lakes.

Colourless or weakly coloured derivatives of aliphatic polyamines are used as water soluble nitrogen compounds according to the present invention which have a precipitating action on dyestuffs containing sulphonic acid groups and can be used for improving the water fastness of metal lakes of acid azo dyestuffs. Examples of such polyamines are ethylenediamine, tetramethylenediamine and other polyalkylene diamines, diethylenetriamine, triethylene tetramine and other polyalkylene polyamines.

Products used as derivatives of such polyamines are those which are obtained by condensing such polyamines with compounds which contain at least once the grouping:

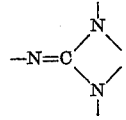

The following are given as examples: dicyandiamide, guanidine, acetoguanidine, guanyl urea and guanyl melamines.

A further, particularly valuable group of organic nitrogen derivatives which can be used according to the present invention are obtained by condensing compounds containing at least once the grouping:

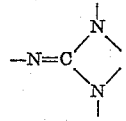

examples of which have been given above, with saturated or unsaturated, aliphatic or cyclic aldehydes, in particular with formaldehyde. It is also possible to condense such products with or in the presence of water soluble ammonium or amine salts.

The organic nitrogen compounds usable according to the present invention are known compounds or they can be produced by the usual methods.

These agents for improving the water fastness are incorporated into the azo dyestuff lakes best under conditions which permit no or only a slight precipitation. They are incorporated most simply by milling them together with the dry colour lakes. Some of the components however, can also be mixed when damp and milled into powder form after the drying process. The amounts necessary of the compounds according to the present invention depend on the relative water solubility of the azo dyestuff lakes used. Generally amounts of 5 to 12% by weight are sufficient, calculated on the weight of the lake. Also the usual auxiliary agents and substrata can be added.

Combined with metal lakes of azo dyestuffs containing sulphonic acid groups, such as are disclosed for example in German Patent No. 145,908, in German Patent No. 112,833 or in Belgian Patent No. 544,885, the compounds according to the present invention cause, for example, a noticeable improvement in the fastness to wet rubbing of the pigmentations attained with these lakes in organic material, in particular thermoplastic synthetic materials. The fastness to light, purity, transparency and other properties of the dyeings are however, barely influenced by them at all.

The following examples illustrate the invention without limiting it in any way however. In these examples the parts are given as parts by weight and their relationship to parts by volume is as that of kilogrammes to litres.

*Example 1*

10 parts of the sodium salt of the azo dyestuff from diazotised 2-chloro-5-amino-1-methylbenzene-4-sulphonic acid coupled with 2-hydroxynaphthalene are thoroughly mixed and milled with 0.5 part of a condensation product from polyethylene polyamines and dicyandiamide. On testing according to the soaking test, the metal lake so treated proves to be almost completely water fast.

The water fastness is tested as follows: 0.2 part of the colour lake so obtained is soaked in a little sack made out of folded filter paper, for 24 hours in 10 parts of tap water of room temperature. After removing the filter paper sack, the colour strength of the solution is compared with that of another solution made in a parallel test with the same metal lake but without the addition of the organic nitrogen compound. It is found that the metal lake which has been treated is almost completely water fast whilst the lake without the addition of the nitrogen compound leaves a clearly coloured solution.

The nitrogen compound used is produced as follows: 20.6 parts of a mixture of polyethylene polyamines (boiling range over 190° under 12 mm. Hg pressure) and 16.8 parts of dicyandiamide are slowly heated to 165° in a glass flask fitted with a reflux condenser and a stirrer. The mixture is kept for about 4 hours at this temperature. A sample should still be water soluble. It is allowed to cool and the condensation product obtained is pulverised.

*Example 2*

10 parts of the sodium salt of the azo dyestuff from diazotised 2-aminonaphthalene-1-sulphonic acid and 2-hydroxynaphthalene are thoroughly mixed and milled with 0.7 part of a condensation product from triethylene tetramine and dicyandiamide. A colour lake which has the same fastness to light as the starting material but an improved water fastness is obtained.

The nitrogen-containing condensation product is obtained as follows: 146 parts of triethylene tetramine (boiling point 270–271°) and 84 parts of dicyandiamide are slowly heated to 110° while stirring in a flask fitted with a reflux condenser. The temperature is then gradually raised to 140°. After heating for about 15 hours, the mass is poured into a dish, cooled and pulverised.

*Example 3*

10 parts of the calcium lake from diazotised 1-aminobenzene-2.5-disulphonic acid coupled with 2-hydroxynaphthalene - 3 - carboxylic acid - 1' - naphthylamide are well mixed and milled with 0.8 part of a condensation product from diethylene triamine and dicyandiamide. A colour lake which has very good water fastness is obtained. If 0.6% of this colour lake is incorporated into a polyvinyl chloride foil containing plasticiser on a set of hot mixing rollers, a foil is obtained the fastness to wet rubbing of which, when tested in the crock-o-meter with a piece of damp white cotton, is considerably better than that of a foil pigmented without the addition of the condensation product.

The nitrogen-containing compound can be produced as follows: 51.5 parts of diethylene triamine and 82 parts of dicyandiamide are slowly heated while stirring to 100° in a glass flask fitted with a reflux condenser and then the temperature is raised to 180° within a few hours. The mass becomes viscous. It is poured into a dish, allowed to cool and pulverised.

*Example 4*

10 parts of the barium lake of the azo dyestuff from diazotised 1aminobenzene-2.5-disulphonic acid and 2-hydroxynaphthalene-3-carboxylic acid-2'.4'-dimethoxy-5'-chloranilide are mixed and finely milled with 0.8 part of a condensation product from urea, dicyandiamide and formaldehyde. A practically water fast colour lake is obtained whereas the starting material bleeds strongly in water.

The condensation product used is obtained by slowly heating 10 parts of urea, 25 parts of 30% hydrochloric acid and 14.3 parts of dicyandiamide to 95°, adding 40 parts of formaldehyde 33%, further condensing at 70° and then drying the whole mass in an atomising drier.

*Example 5*

10 parts of the barium lake of the dyestuff from diazotised 1-aminobenzene-2.5-disulphonic acid and 2-hydroxynaphthalene - 3 - carboxylic acid-2'-methyl-4'-chloranilide are mixed and well milled with 1.2 parts of the nitrogen-containing condensation product obtained as described in Example 4. A colour lake having good water fastness is obtained.

A compound obtained by boiling under reflux 34 parts of dicyandiamide, 18 parts of urea, 5.5 parts of ammonium chloride, 75 parts of water and 45 parts of 30% hydrochloric acid, adding 80 parts of formaldehyde 37.4%, further condensing at 80° and then adding 10 parts of glacial acetic acid, can also be used as active condensation product.

A basic condensation product having a similar action is obtained by melting together 33.6 parts of dicyandiamide and 6.5 parts of paraformaldehyde. The temperature is slowly raised to 150° whereupon a strong reaction occurs. After cooling, a brittle mass is obtained. This is ground and heated in a thin layer to 170–180° whereupon it is again finely ground. An amorphous powder is finally obtained.

What I claim is:

1. A solid composition of matter which consists essentially of metal lakes of azo dyestuffs containing sulphonic acid groups and about 5 to 12% by weight of a water soluble nitrogen compound selected from the group consisting of (a) condensation products from aliphatic polyamines and compounds which contain the grouping:

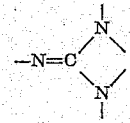

and (b) condensation products from aldehydes and compounds which contain the grouping:

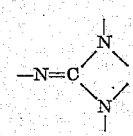

2. A solid composition of matter which consists essentially of metal lakes of azo dyestuffs containing sulphonic acid groups and about 5 to 12% by weight of a water soluble condensation product of triethylene tetramine and dicyandiamide.

3. A solid composition of matter which consists essentially of metal lakes of azo dyestuffs containing sulphonic acid groups and about 5 to 12% by weight of a water soluble condensation product of diethylene triamine and dicyandiamide.

4. A solid composition of matter which consists essentially of metal lakes of azo dyestuffs containing sulphonic acid groups and about 5 to 12% by weight of a water soluble formaldehyde condensation product of urea and dicyandiamide.

References Cited in the file of this patent

UNITED STATES PATENTS

| | | |
|---|---|---|
| 1,951,298 | Wagner | Mar. 13, 1934 |
| 2,123,152 | Rivat | July 5, 1938 |
| 2,257,239 | Krazikalla et al. | Sept. 30, 1941 |
| 2,416,884 | Schrieber et al. | Mar. 4, 1947 |
| 2,474,909 | Olpin et al. | July 5, 1949 |
| 2,902,472 | Cook et al. | Sept. 1, 1959 |

FOREIGN PATENTS

| | | |
|---|---|---|
| 871,384 | France | Apr. 22, 1942 |
| 145,908 | Germany | Sept. 26, 1902 |
| 112,833 | Germany | Dec. 17, 1899 |
| 428,835 | Belgium | June 25, 1938 |